Patented Jan. 4, 1927.

1,613,366

UNITED STATES PATENT OFFICE.

ROBERT H. VAN SCHAACK, JR., OF EVANSTON, ILLINOIS.

ESTER OF BUTYL ALCOHOL.

No Drawing.  Application filed August 21, 1925. Serial No. 51,685.

My invention relates to a new composition of matter. It consists of the esters of butyl alcohol with the higher fatty acids, either singly or mixed. The usefulness of such a composition will be apparent from certain details of the description of the invention, and also from my copending application Serial No. 31,915, filed May 21, 1925. For example, I have found the butyl esters of the higher fatty acids to be desirable ingredients of the film left by the evaporation of pyroxylin lacquers. Such esters make the film relatively pliable and soft, the extent of increase in pliability and softness depending upon the proportion of such ester added as a softener.

The butyl esters of organic acids have only recently acquired a new importance. Formerly, butyl alcohol, one of the essential materials of manufacture, was of theoretical interest almost exclusively. The quantity available was small. The price was high. Now a very successful process of producing butyl alcohol by fermentation has made this alcohol available in tank-car lots. Indeed, the availability of butyl alcohol and of its derivative, butyl acetate, in adequate quantities, is responsible in large measure for the recent great expansion of the lacquer industry for finishing automobiles and furniture.

Stimulated by the increasing importance of butyl alcohol, I have invented a new composition of matter containing the hydrocarbon radical ($C_4H_9$) of butyl alcohol, namely butyl esters of the higher fatty acids.

I may make the butyl esters of the higher fatty acids by the reaction of butyl alcohol on the acid whose ester it is desired to produce, in the presence of hydrogen chloride or sulfuric acid as the catalyst, the temperature of reaction and the time allowed for the combination to occur being adjusted to suit factory conditions.

To make butyl stearate for example, I may mix 284 parts by weight of stearic acid with 74 parts of butyl alcohol and 4 parts of concentrated sulfuric acid. The mixture is then boiled gently in a pot provided with a reflux condenser for returning vapors of uncombined butyl alcohol. After six hours, sufficient precipitated calcium carbonate (whiting) is added to neutralize the sulfuric acid, and the pot is disconnected from the reflux condenser and connected, instead, with a down condenser so that the vapors of butyl alcohol, as they condense, run down into a receiver. When no more material distils at temperatures below 190°, the butyl stearate itself is distilled in a vacuum of the degree produced by an efficient vacuum pump of the oil-sealed type, by a pump commonly spoken of as an "oil vacuum pump."

The high boiling point which necessitates that the distillation be performed in vacuo indicates one of the merits of my new compositions of matter, non-volatility at ordinary temperatures. The butyl esters resemble, to a degree, the glycerides of fats and certain oils. But the former are preferable for certain uses. They are more soluble in certain organic solvents. They are almost colorless, after vacuum distillation, and they are not so unpleasant in odor as lard, cottonseed oil, or castor oil.

The butyl esters invented by me differ from the corresponding ethyl esters especially in volatility, somewhat as butyl alcohol differs from ethyl alcohol, with its relatively low boiling point.

My invention is not limited to the specific illustration given. It includes esters of normal butyl alcohol, with one or more of the higher fatty acids. Among those acids may be listed the following:

Pelargonic ($C_8H_{17}COOH$),
Capric ($C_9H_{19}COOH$),
Lauric ($C_{11}H_{23}COOH$),
Myristic ($C_{13}H_{27}COOH$),
Palmitic ($C_{15}H_{31}COOH$),
Stearic ($C_{17}H_{35}COOH$),
Arachidic ($C_{19}H_{39}COOH$).

By the words "higher fatty acids" as used in the specifications and claims, I mean not only the acids listed above, with their isomers and homologs, but also other saturated acids of the aliphatic series containing more than 8 carbon atoms to the molecule, such as the monocarboxylic dicarboxylic, or hydroxy acids.

The esters of butyl alcohol with these higher fatty acids are waxes or liquids, practically non-volatile at ordinary temperatures, and soluble in alcohol, acetone, ether, and ethyl acetate. Butyl stearate, as made from normal butyl alcohol and commercial stearic acid, is a colorless liquid at temperatures above 18° C.; below 18° C., it freezes to a white opaque wax. It is practically odorless, insoluble in water, and unaffected by long exposure to air. Such properties make these esters preferable to already known products, such as castor oil, for certain purposes.

Any one of my new esters is identified by saponification number, iodine absorption number, and melting point of the fatty acid derived from it by saponification and acidification in the well known manner.

I do not limit myself to any method of manufacture of the butyl esters or to any use or uses of them.

What I claim is:—

1. A new composition of matter comprising a normal butyl ester of a higher fatty acid, saturated with respect to hydrogen.

2. A new composition of matter comprising a normal butyl ester of a fatty monocarboxylic acid containing more than eight carbon atoms to the molecule, and saturated with respect to hydrogen.

3. A new composition of matter comprising butyl stearate.

In testimony, that I claim the foregoing as my own I have hereto affixed my signature.

R. H. VAN SCHAACK, Jr.